United States Patent
Uriu et al.

(10) Patent No.: US 7,194,610 B2
(45) Date of Patent: Mar. 20, 2007

(54) PROCESSOR AND PIPELINE RECONFIGURATION CONTROL METHOD

(75) Inventors: Shiro Uriu, Yokohama (JP); Mitsuharu Wakayoshi, Yokohama (JP); Tetsuo Kawano, Kawasaki (JP); Hiroshi Furukawa, Kawasaki (JP); Ichiro Kasama, Kawasaki (JP); Kazuaki Imafuku, Kawasaki (JP); Toshiaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 11/063,860

(22) Filed: Feb. 23, 2005

(65) Prior Publication Data
US 2006/0004993 A1  Jan. 5, 2006

(30) Foreign Application Priority Data
Jun. 30, 2004  (JP) .............................. 2004-193580

(51) Int. Cl.
*G06F 13/00* (2006.01)
(52) U.S. Cl. ..................... 712/241; 712/36; 716/17
(58) Field of Classification Search ................. 712/36, 712/241; 716/16, 17
See application file for complete search history.

(56) References Cited

U.S. PATENT DOCUMENTS 6,757,892 B1 * 6/2004 Gokhale et al. ............ 717/161

FOREIGN PATENT DOCUMENTS

JP  9-237186  9/1997

OTHER PUBLICATIONS

Reiner Hartenstein, "A Decade of Reconfigurable Computing: A Visionary Retrospective", Proceedings of the Conference on Design, Automation, and Test in Europe, IEEE, Mar. 13-16, 2001, pp. 642-649.*

* cited by examiner

*Primary Examiner*—William M. Treat
(74) *Attorney, Agent, or Firm*—Staas & Halsey LLP

(57) ABSTRACT

A reconfigurable processor calculates execution times of configuration for executing pipeline processing from hardware configuration information, and fixes a clock cycle until processing ends. A counter compares the fixed clock cycle with the actual number of elapsed clocks, and, when the number of elapsed clocks equals the clock cycle, it is determined that pipeline processing has ended, and a configuration controller is notified of this.

7 Claims, 6 Drawing Sheets

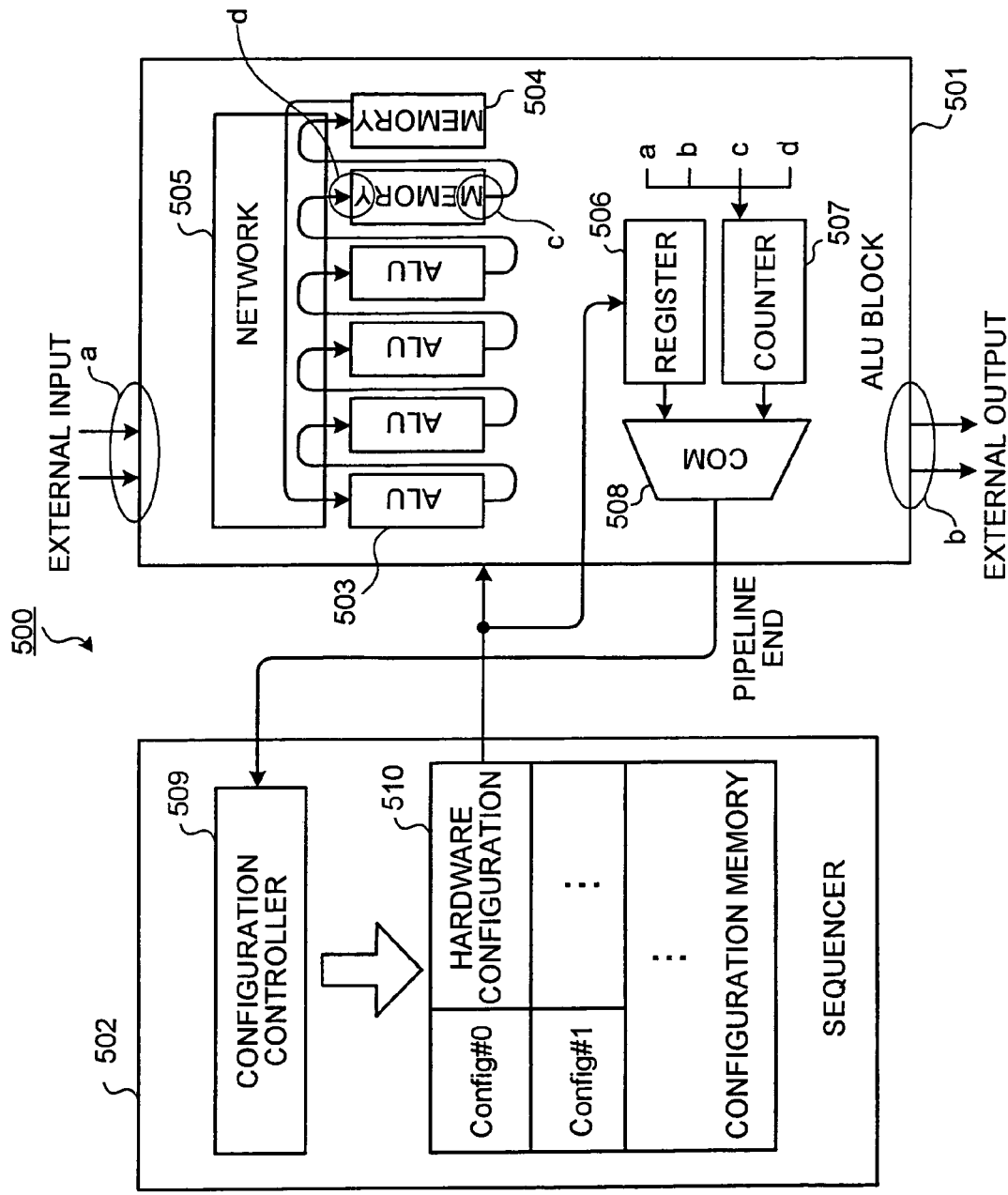

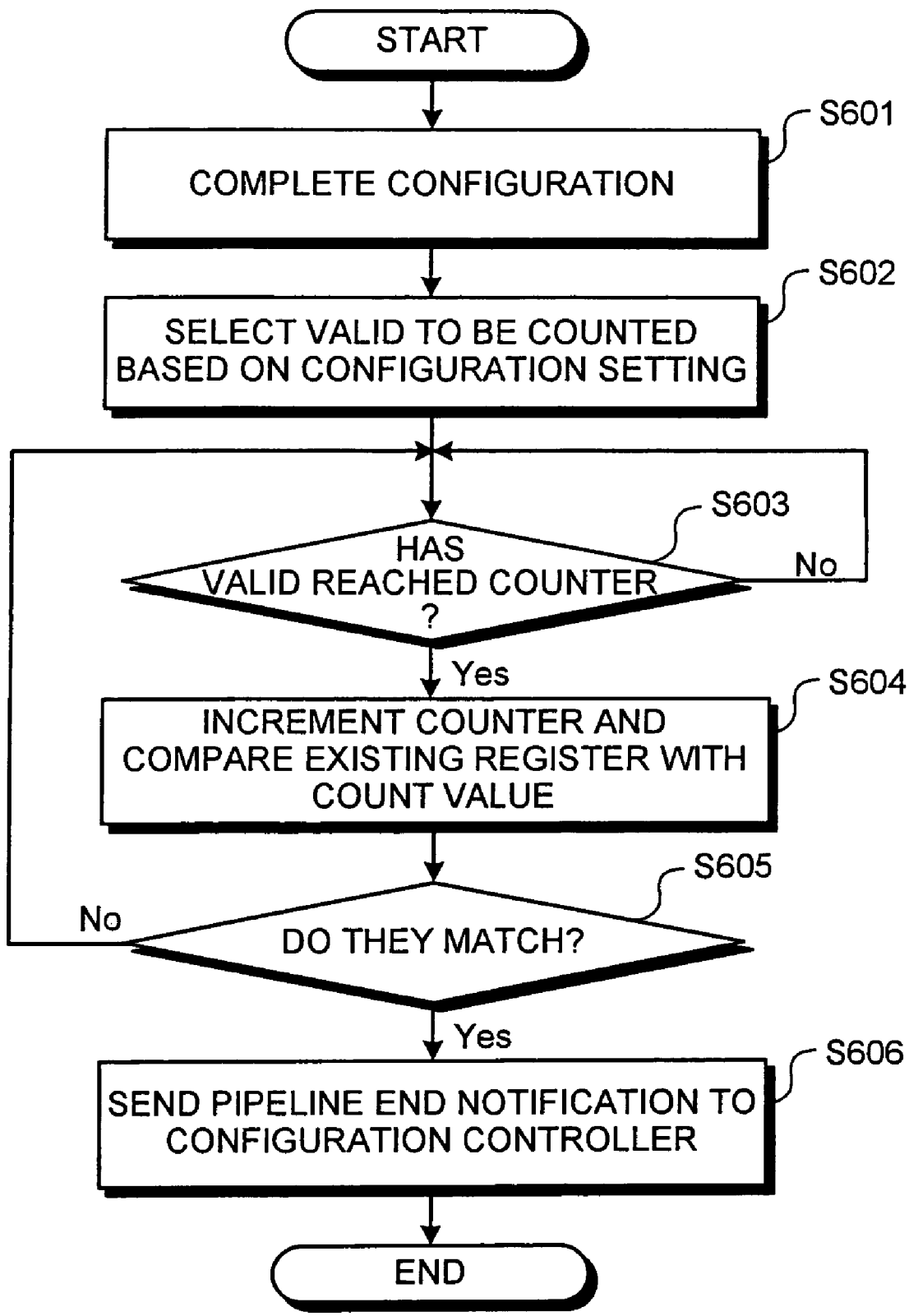

US 7,194,610 B2

PROCESSOR AND PIPELINE RECONFIGURATION CONTROL METHOD

CROSS-REFERENCE TO RELATED APPLICATIONS

This application is based upon and claims the benefit of priority from the prior Japanese Patent Application No. 2004-193580, filed on Jun. 30, 2004, the entire contents of which are incorporated herein by reference.

BACKGROUND OF THE INVENTION

1) Field of the Invention

The present invention relates to a processor and a pipeline reconfiguration control method in reconfigurable hardware.

2) Description of the Related Art

Recently, there are dynamic reconfigurable techniques for dynamically reconfiguring hardware to suit applications, by using reconfigurable hardware to allow applications to be flexibly handled with while actually executing processing. One example of reconfigurable hardware is an arithmetic and logic unit (ALU) module, which is a circuit that performs processing such as four-arithmetic operations, logic operations, and the like. Performance can be increased by connecting a plurality of ALU modules using a reconfigurable network, and performing pipeline processing that achieves simultaneous parallel operation processing by the ALU modules.

In particular, the number of execution cycles can be effectively reduced by using pipeline processing when executing loop commands. When executing loop commands by pipeline processing, an apparatus has been disclosed that optimizes the arrangement of the loop initial command, and reduces overheads at loop start, by using a loop control apparatus that includes a loop address start register, a loop address end register, a comparator, and a loop counter (Japanese Patent Application Laid-open No. H9-237186 Publication).

However, when pipeline processing has been executed, it is important to determine an opportunity for switching the arrangement of the reconfigurable hardware section (hereinafter, "configuration"), which is, to determine the time when one series of processes has ended, since, when reconfiguration is performed after the series of processes ends, the switching time becomes an overhead of the overall processing and results in performance deterioration.

SUMMARY OF THE INVENTION

It is an object of the present invention to solve at least the problems in the conventional technology.

A processor according to an aspect of the present invention, that executes predetermined operation processes while switching the connection configuration of a plurality of arithmetic and logic unit (ALU) modules having a plurality of ALUs, comprises an execution time calculation unit that calculates an execution time of each connection configuration of the ALU modules, a clock counter that clock-counts execution cycles of the operation processes, and a configuration control unit that switches the connection configuration of the ALU modules when a clock number, counted by the clock counter, has reached the execution time, calculated by the execution time calculation unit.

According to the invention, the execution time of an operation made by one configuration can be calculated by using a clock cycle, and the end time of pipeline processing can be determined without monitoring the actual data processing status of the ALU block.

And, a processor according to another aspect of the present invention, that executes predetermined operation processes while switching the connection configuration of a plurality of arithmetic and logic unit (ALU) modules having a plurality of ALUs, comprises, a setting unit that sets a processed data number for each connection configuration of the ALU modules, a counter that counts the processed data number of each connection configuration of the ALU modules, and a configuration control unit that switches the connection configuration of the ALU modules when the processed data number, counted by the counter, has reached the processed data number, set by the setting unit.

According to the invention, since an ALU block monitors the target data, the end time of pipeline processing can be determined flexibly corresponding to various situations, such as when inputting from the outside or when outputting operation results to the outside, irrespective of memory reads and writes.

And, a reconfiguration control method according to still another aspect of the present invention, using a processor that executes predetermined operation processes while switching the connection configuration of a plurality of arithmetic and logic unit (ALU) modules having a plurality of ALUs, the method comprises, an execution time calculating step of calculating an execution time of each connection configuration of the ALU modules, a clock-counting step of clock-counting execution cycles of the operation processes, and a configuration control step of switching the connection configuration of the ALU modules when a clock number, counted in the clock-counting step, has reached the execution time, calculated in the execution time calculating step.

And, a reconfiguration control method according to still another aspect of the present invention, using a processor that executes predetermined operation processes while switching the connection configuration of a plurality of arithmetic and logic unit (ALU) modules having a plurality of ALUs, comprises, a setting step of setting a processed data number for each connection configuration of the ALU modules, a counting step of counting the processed data number of each connection configuration of the ALU modules, and a configuration control step of switching the connection configuration of the ALU modules when the processed data number, counted in the counting step, has reached the processed data number, set in the setting step.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a block diagram of a reconfigurable processor according to a second embodiment.

FIG. 6 is a flowchart of a pipeline processing end determination process that is executed by counting the number of processed data.

DETAILED DESCRIPTION

Exemplary embodiments of a processor and a pipeline reconfiguration control method according to the present invention will be explained below in detail with reference to the accompanying drawings.

A configuration that determines the end of pipeline processing from the start of executing one configuration by reconfigurable hardware will be explained, with reference to the following embodiments.

Figure 1:
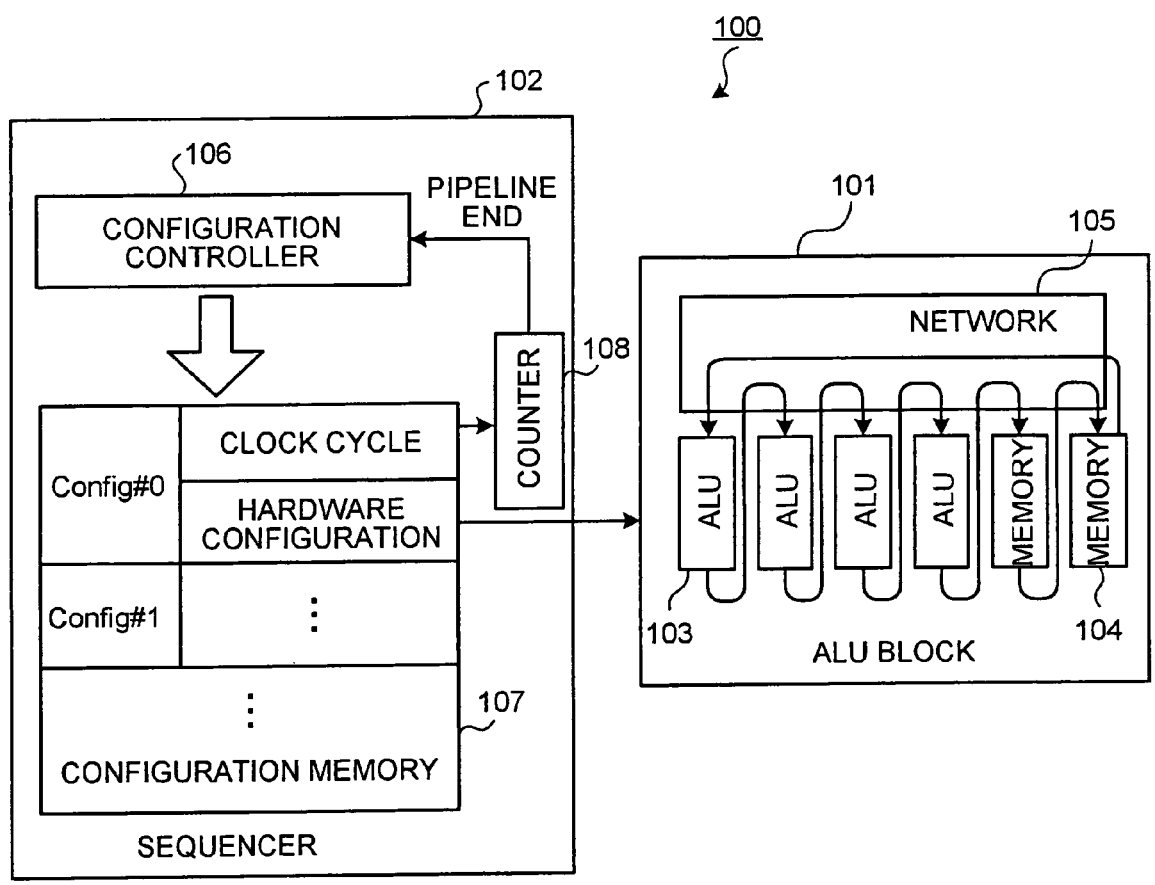
FIG. 1 is a block diagram of a reconfigurable processor according to a first embodiment.

Firstly, a configuration that determines the end of pipeline processing by using a clock cycle count will be explained. FIG. 1 is a block diagram of a reconfigurable processor according to a first embodiment.

A reconfigurable processor 100 includes an ALU block 101 that is a reconfigurable hardware unit, and a sequencer 102 that monitors the status of the configuration of the ALU block 101.

The ALU block 101 includes a plurality of ALU 103, and a plurality of memories 104 that store data operated by the ALU block 101. The ALU 103 and the memories 104 connect to a network 105. Data specified by the sequencer 102 is read from the memories 104, and input via the network 105 to the ALU block 101. The ALU block 101 performs an operation specified by configuration information, and the operation result is stored in the memories 104 via the network 105. The connection between the ALU 103 and the memories 104 in the network 105 can be changed, the connection between the ALU 103 and the memories 104 being changed (reconfigured) based on configuration information supplied from the sequencer 102.

The sequencer 102 includes a configuration controller 106, a configuration memory 107, and a counter 108. The configuration memory 107 stores hardware configurations that set the arrangement and processing content of the ALU block 101, and information relating to clock cycles, required until each configuration is completed. The hardware configurations are set beforehand, and the clock cycles are fixed at the time of compiling the hardware configuration information.

The hardware configuration information is sent to the ALU block 101, and the hardware is reconfigured based on this information. The clock cycle information is sent to the counter 108. The counter 108 determines the end of pipeline processing by comparing the clock cycle information sent from the configuration memory 107 with the actual clock number, and notifies the configuration controller 106 that the pipeline has ended. The configuration controller 106 receives the notification that the pipeline has ended, and issues a command to switch the configuration to the configuration memory 107.

A sequence for fixing a clock cycle based on the hardware configuration information in the configuration memory 107 will be explained with reference to FIGS. 2 and 3.

Figure 2:
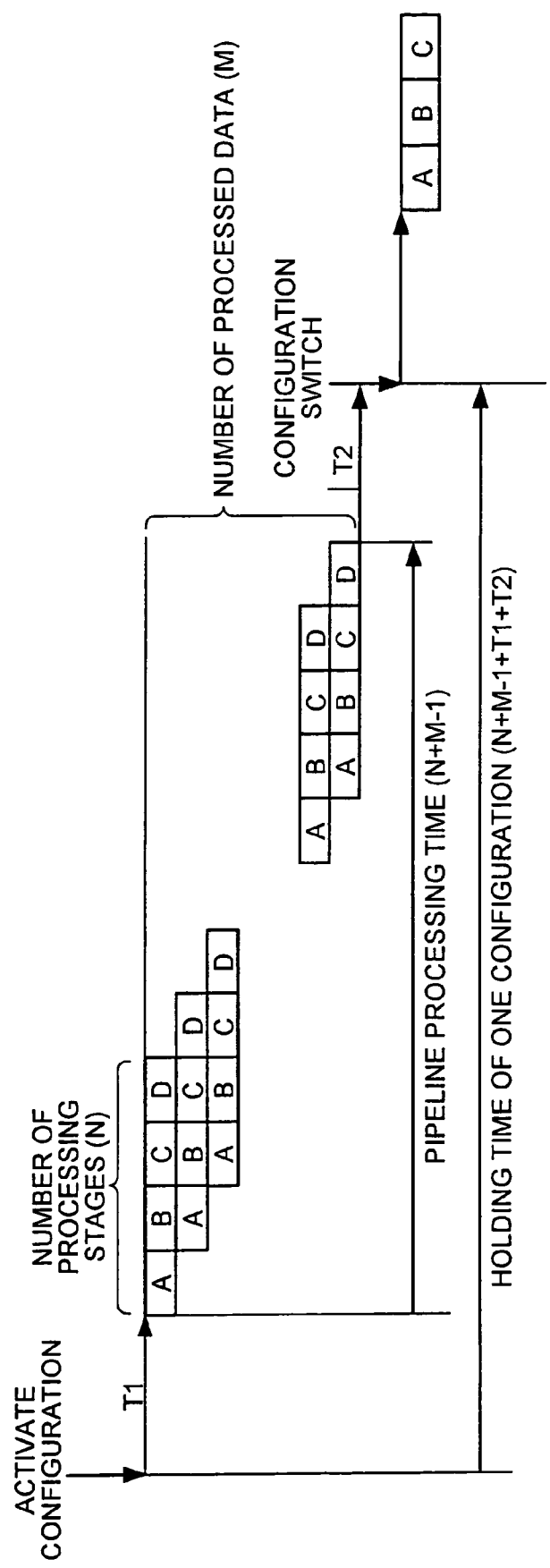
FIG. 2 is a timing chart for explaining the execution time of one configuration.

FIG. 2 is a timing chart of the execution time of one configuration. Four operation stages A to D are required to process one data, one stage being performed in one clock. At the time of issuing a loop command for the program, pipeline processing simultaneously processes a plurality of data while shifting the operation block one stage at a time. Therefore, when M data operate N stages of operations, the pipeline processing time is N+M−1. In fact, there is always a processing time (T1) from configuration activation until pipeline processing starts, and a processing time (T2) until it becomes possible to switch to the next configuration, so the execution time of one configuration is N+M−1+T1+T2.

Figure 3:
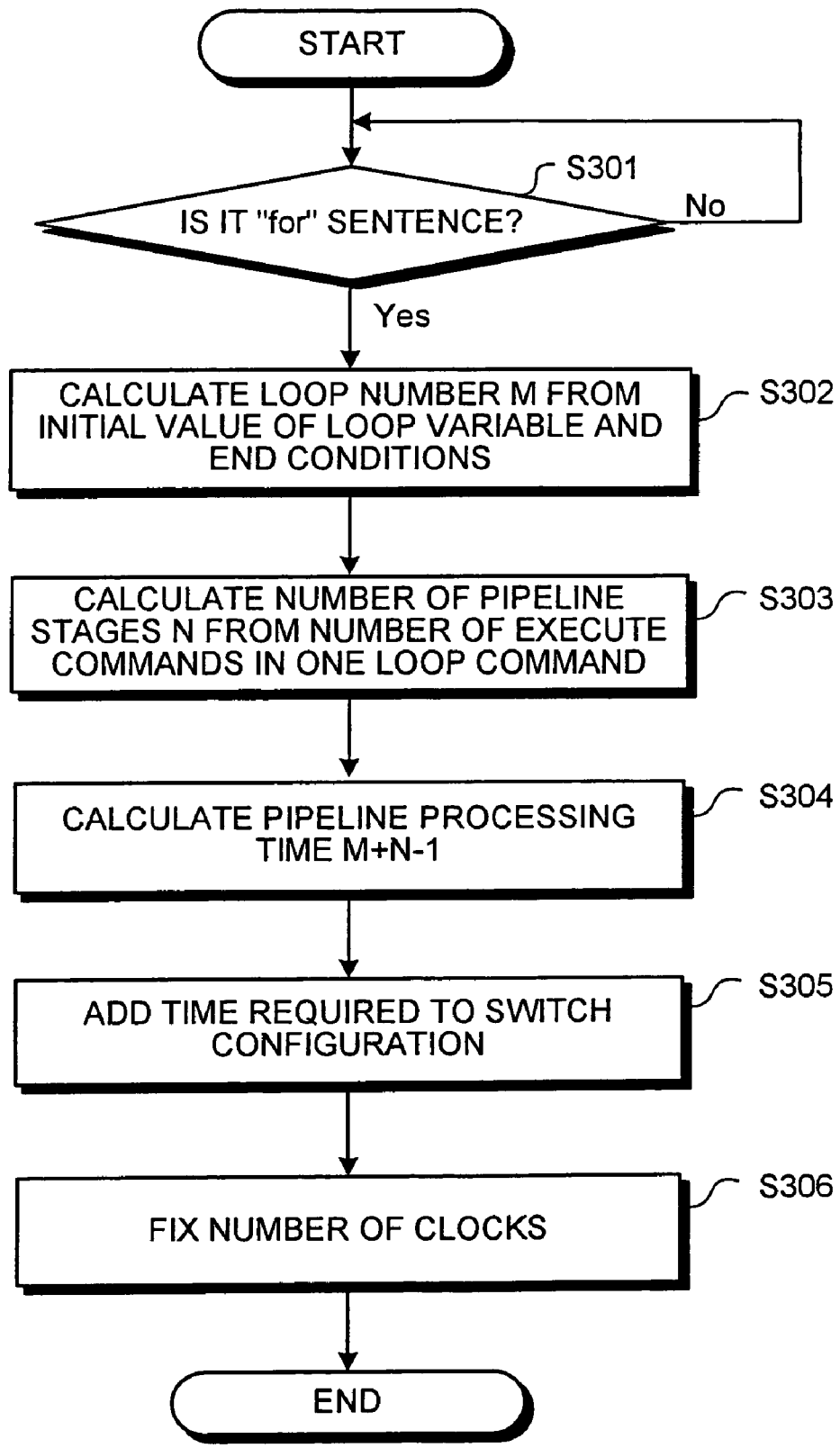
FIG. 3 is a flowchart of processing that fixes one configuration by using a clock number.

FIG. 3 is used to explain the flow of fixing a clock cycle, performed by the configuration memory 107 at the time of compiling by using the characteristics of the pipeline processing described above. FIG. 3 is a flowchart of processing that fixes one configuration by using a clock number.

Firstly, the configuration memory 107 determines whether the processing to be performed is a loop command, for example, whether the program is a "for" sentence (step S301). When the processing is a loop command (step S301: Yes), the loop number M is operated from the initial value of the loop variable in the program and the end conditions (step S302). When the processing is not a loop command (step S301: No), the process returns to step S301, and shifts to determining the loop command of the next program. The value M represents the number of data for executing the processing.

The number of pipeline stages N is then operated from the number of execute commands in one loop command of the program (step S303). Using the operated value, the pipeline processing time is operated by M+N−1 (step S304). The times required before and after to switch the configuration (T1 and T2 in FIG. 2) are added to the pipeline processing time (step S305). The number of clocks is fixed by dividing the execution time of the configuration, operated in the above manner, by the unit clock time (step S306), and the operation ends. One configuration corresponds to the execution period of one loop process.

Figure 4:
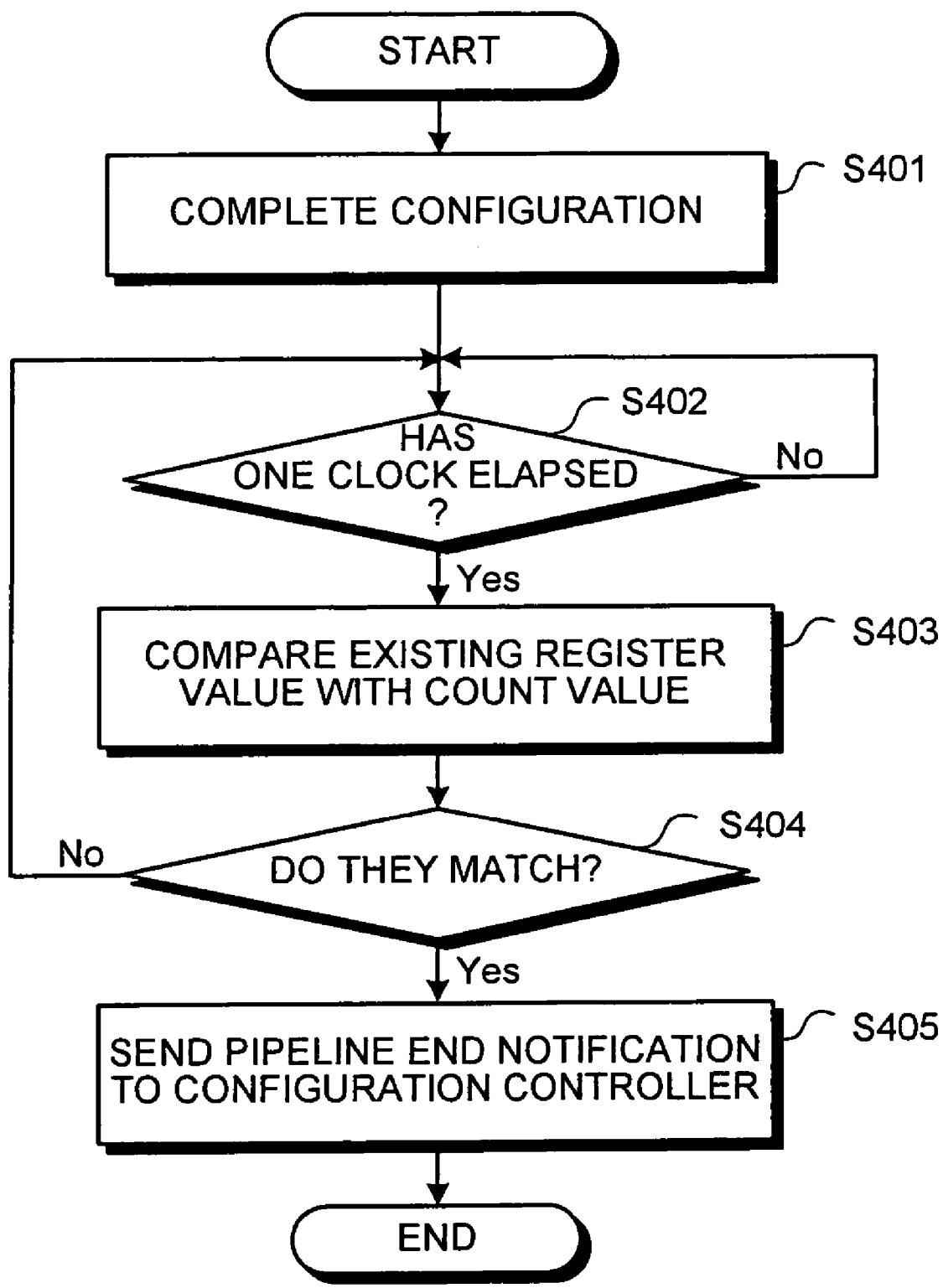
FIG. 4 is a flowchart of a pipeline processing ending determining process, executed by clock count.

A configuration that determines the end of pipeline processing by using the clock cycle, fixed by the configuration memory 107, will be explained. FIG. 4 is a flowchart of a pipeline processing end determining process, executed by clock count.

Firstly, from the clock cycle information received from the configuration memory 107, the counter 108 confirms completion of the configuration, and starts an end determination operation (step S401). It is determined whether one clock has elapsed (step S402), and, when one clock has elapsed (step S402: Yes), the register value (number of clock cycles) set by the sequencer 102 is compared with the count value (step S403).

When one clock has not elapsed (step S402: No), the elapse is determined again. When the register value matches the counter value (step S404: Yes), pipeline processing ends, a pipeline end notification is sent to the configuration controller 106 (step S405), and the operation ends. When they do not match (step S404: No), the operation returns once again to clock elapse determination, and the next clock value is compared with the register value.

According to the first embodiment, the execution time of an operation performed by one configuration can be operated by using the clock cycle, and the pipeline end time can be determined without monitoring the actual data processing status of the ALU block. Consequently, the ALU block can be reconfigured efficiently with no overhead.

A determination of pipeline processing ending, made by counting the number of processed data will be explained next. FIG. 5 is a block diagram of a reconfigurable processor according to a second embodiment.

The reconfigurable processor 500 includes an ALU block 501 that is a reconfigurable hardware unit, and a sequencer 502 that monitors the status of the configuration of the ALU block 501.

The ALU block 501 includes ALU 503, memories 504, and a network 505, which have the functions and constitu tions as those of the reconfigurable processor 100 in the first embodiment, in addition, includes a register 506, a counter 507, a comparator (COM) 508, and external inputs/outputs, for counting the number of processed data.

Hardware configuration information is sent from the sequencer 502 to the register 506, and the register value is set based on this information. The counter 507 counts four types of data, represented in FIG. 5 as a (externally input data), b (externally output data), c (memory read data), and d (memory write data). The hardware configuration specifies which data to count. The comparator 508 compares the values of the register 506 and the counter 507, and notifies the sequencer 502 of the pipeline ending.

The sequencer 502 includes a configuration controller 509 and a configuration memory 510. The configuration memory 510 stores the hardware configuration of each configuration. Hardware configuration information is sent to the ALU block 501, and the hardware is reconfigured based on this information. The configuration controller 509 receives a notification that the pipeline has ended, and issues a command to switch the configuration to the configuration memory 510.

The number of data to be processed is determined in one configuration. Therefore, the number of data to be processed are counted, and, when a predetermined number of data is reached, it is determined that pipeline processing has ended. There are four types of counted data, a to d, as described earlier. Valid information (also known as a token bit) is appended to each data, and indicates that operation processing using the data is valid. Actually, the counter 507 counts and accumulates the number of valids appended to the four types of data.

A pipeline processing end determination operation, actually performed by the ALU block 501 by using the characteristics described above, will be explained. FIG. 6 is a flowchart of a pipeline processing end determination process that is executed by counting the number of processed data.

The completion of the configuration is confirmed based on the hardware reconfiguration information received from the configuration memory 510 of the sequencer 502, and the end determination operation starts (step S601). The valid to be counted is selected based on the configuration setting (step S602). It is then determined whether information of the valid that is selected in step S602 has reached the counter 507 (step S603).

When the selected valid has reached the counter 507 (step S603: Yes), the value of the counter 507 is incremented, and the comparator 508 compares it with the value of the register 506, which is already set by the hardware configuration information (step S604). When the valid has not reached the counter 507 (step S603: No), it is determined again whether a valid has reached the counter 507. When the value of the counter 507 matches the value of the register 506 (step S605: Yes), the pipeline processing has ended, and a pipeline processing end notification is sent to the configuration controller 509 of the sequencer 502 (step S606), whereby the operation ends. When the value of the counter 507 does not match the value of the register 506 (step S605: No), it is determined again whether a valid has reached the counter 507.

The end time can be accommodated to unexpected input statuses by counting valids in the manner described above. Further, the configuration can be switched at high-speed. Consider an example when there are four pipeline stages, namely, when four types of processes A, B, C, and D, are executed as in the first embodiment, thereby ending one series of processes with respect to one input. In this case, by counting the valids of the input data, the sequencer 502 can be notified of the end of processing while the processes of B, C, and D, are being executed to the final data, enabling the switching configuration processing to be activated earlier.

According to the second embodiment, since the ALU block monitors the data being processed, the end time of pipeline processing can be determined flexibly corresponding to various situations, such as when inputting from the outside or when outputting operation results to the outside, irrespective of memory reads and writes.

The pipeline reconfiguration opportunity control method described in the above embodiments can be realized by making the processor of a computer execute a program that is prepared beforehand. The program is stored on a computer-readable recording medium, such as a hard disk, a flexible disk, a CD-ROM, an MO, or a DVD, and the computer executes the program by reading it from the recording medium. This program may be a transmission medium that can be distributed via a network such as the Internet.

According to the processor and the pipeline reconfiguration control method of the present invention, the end time of pipeline processing can be correctly determined, and the reconfiguration switching time can be shortened.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A processor that executes predetermined operation processes while switching the connection configuration of a plurality of arithmetic and logic unit (ALU) modules having a plurality of ALUs, comprising:
   a setting unit that sets a processed data number for each connection configuration of the ALU modules;
   a counter that counts the processed data number of each connection configuration of the ALU modules; and
   a configuration control unit that switches the connection configuration of the ALU modules when the processed data number, counted by the counter, has reached the processed data number, set by the setting unit.

2. The processor according to claim 1, comprising a storage unit that stores information relating to the processed data number of each connection configuration of the ALU modules, set by the setting unit, wherein
   the configuration control unit switches the connection configuration of the ALU modules after reading information relating to a next connection configuration from the plurality of information stored in the storage unit.

3. The reconfigurable processor according to claim 1, wherein the counter counts any one of the following:
   externally input data, input from outside the ALU modules,
   externally output data, output from the ALU modules;
   data written to memory, set by the ALU modules; and
   data read from memory, set by the ALU modules.

4. The processor according to claim 3, wherein the storage unit stores categories of processed data to be counted by the counter.

5. The processor according to claim 1, wherein the counter counts data to which valids, which indicate that an operation to the processed data is valid, are appended.

6. A pipeline reconfiguration control method, using a processor that executes predetermined operation processes while switching the connection configuration of a plurality of arithmetic and logic unit (ALU) modules having a plurality of ALUs, comprising:
- a setting step of setting a processed data number for each connection configuration of the ALU modules;
- a counting step of counting the processed data number of each connection configuration of the ALU modules; and
- a configuration control step of switching the connection configuration of the ALU modules when the processed data number, counted in the counting step, has reached the processed data number, set in the setting step.

7. The reconfigurable processor according to claim 6, wherein the counter counts any one of the following:
- externally input data, input from outside the ALU modules;
- externally output data, output from the ALU modules:
- data written to memory set by the ALU modules; and
- data read from memory set by the ALU modules.

* * * * *

UNITED STATES PATENT AND TRADEMARK OFFICE
CERTIFICATE OF CORRECTION

PATENT NO. : 7,194,610 B2 Page 1 of 1
APPLICATION NO. : 11/063860
DATED : March 20, 2007
INVENTOR(S) : Shiro Uriu et al.

It is certified that error appears in the above-identified patent and that said Letters Patent is hereby corrected as shown below:

Column 6, Line 56, change "modules," to --modules;--.

Column 8, Line 7, change "modules:" to --modules;--.

Column 8, Line 8, after "memory" insert --,--.

Column 8, Line 9, after "memory" insert --,--.

Signed and Sealed this

Seventh Day of August, 2007

JON W. DUDAS
*Director of the United States Patent and Trademark Office*